US007576298B2

(12) United States Patent
Erb et al.

(10) Patent No.: US 7,576,298 B2
(45) Date of Patent: Aug. 18, 2009

(54) METHOD FOR MAKING A GOLF CLUB FACE

(75) Inventors: Robert W. Erb, Carmel Valley, CA (US); Todd P. Beach, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 492 days.

(21) Appl. No.: 10/819,335

(22) Filed: Apr. 5, 2004

(65) Prior Publication Data

US 2004/0192465 A1 Sep. 30, 2004

Related U.S. Application Data

(62) Division of application No. 10/167,764, filed on Jun. 11, 2002, now Pat. No. 6,719,644.

(51) Int. Cl.
*B23K 26/00* (2006.01)

(52) U.S. Cl. ........................... 219/121.69; 219/121.67; 219/121.85; 219/121.68; 219/121.6

(58) Field of Classification Search ............ 219/121.69, 219/121.67, 121.85, 121.68, 121.6
See application file for complete search history.

(56) References Cited

U.S. PATENT DOCUMENTS

| | | | | |
|---|---|---|---|---|
| 4,530,505 | A * | 7/1985 | Stuff | 473/250 |
| 4,768,787 | A * | 9/1988 | Shira | 473/331 |
| 4,792,140 | A | 12/1988 | Yamaguchi et al. | 273/173 |
| 5,090,702 | A | 2/1992 | Viste | 273/167 H |
| 5,505,450 | A | 4/1996 | Stuff | 273/167 J |
| 5,637,044 | A * | 6/1997 | Swash | 473/331 |
| 5,643,099 | A * | 7/1997 | Solheim | 473/238 |
| 5,688,186 | A | 11/1997 | Michaels et al. | 473/290 |
| 5,709,616 | A | 1/1998 | Rife | 473/330 |
| 5,709,617 | A | 1/1998 | Nishimura et al. | 473/330 |
| 5,755,626 | A | 5/1998 | Shira | 473/330 |
| 5,766,087 | A * | 6/1998 | Kawamatsu | 473/290 |
| 5,800,285 | A * | 9/1998 | Thorne et al. | 473/324 |
| 5,880,430 | A | 3/1999 | Wein | 219/121.69 |

(Continued)

FOREIGN PATENT DOCUMENTS

JP 05-237206 9/1993

(Continued)

OTHER PUBLICATIONS

"Titus Titanium," Maruman Catalog, 1997.

(Continued)

*Primary Examiner*—M. Alexandra Elve
(74) *Attorney, Agent, or Firm*—Klarquist Sparkman, LLP

(57) ABSTRACT

An improved face for a golf club head includes shallow and deep markings configured to provide a pleasing appearance when viewed head on, and to frame the central region of the impact surface of the face when viewed at address. Use of only shallow markings in the central region of the impact surface prevents existence of stress fractures resulting from use of deep markings in the central region. This allows for a face thinner than those incorporating conventional grooves in the central regions of their impact surfaces, resulting in both superior resistance to cracking and improved C.O.R. Specified methods of manufacture are particularly suited for making clubs incorporating these shallow and deep markings.

31 Claims, 2 Drawing Sheets

U.S. PATENT DOCUMENTS

| | | | | |
|---|---|---|---|---|
| D441,819 | S | 5/2001 | Helmstetter et al. | D21/733 |
| 6,224,497 | B1 | 5/2001 | Antonius | 473/330 |
| 6,257,994 | B1 | 7/2001 | Antonius | 473/331 |
| 6,338,683 | B1 | 1/2002 | Kosmatka | 473/329 |
| 6,354,962 | B1 | 3/2002 | Galloway et al. | 473/342 |
| 6,398,665 | B1 | 6/2002 | Antonius | 473/330 |
| 6,398,666 | B1 | 6/2002 | Evans et al. | 473/345 |
| 6,428,427 | B1 * | 8/2002 | Kosmatka | 473/349 |
| 6,443,856 | B1 | 9/2002 | Galloway et al. | 473/330 |
| 6,638,182 | B2 | 10/2003 | Kosmatka | |
| 6,663,504 | B2 | 12/2003 | Hocknell et al. | |
| 6,669,577 | B1 | 12/2003 | Hocknell et al. | |
| 6,676,536 | B1 | 1/2004 | Jacobson | |

FOREIGN PATENT DOCUMENTS

| | | |
|---|---|---|
| JP | 05-237209 | 9/1993 |
| JP | 11-047317 | 2/1999 |
| JP | 2000-254261 | 9/2000 |

OTHER PUBLICATIONS

Photograph of striking face of "The Judge Rules" golf club head, sold by Paradise Golf Equipment, 1998.

* cited by examiner

METHOD FOR MAKING A GOLF CLUB FACE

This is a division of U.S. patent application Ser. No. 10/167,764, filed Jun. 11, 2002, now U.S. Pat. No. 6,719,644, which claims priority from U.S. Provisional Application Ser. No. 60/297,664, filed Jun. 11, 2001.

BACKGROUND OF THE INVENTION

This invention relates generally to golf club heads and, more specifically, to faces for golf club heads that provide for improved performance and appearance. The invention also relates to methods of making such faces for golf club heads.

Golf clubs include a shaft and a head. The head generally includes a hosel, a face, a sole, and a back to form the hollow head. The face includes an exposed impact surface, upon which a golf ball impacts during a golfer's swing. The impact surface, though typically smooth over most of its surface area, can incorporate a number of different markings. These markings can be ornamental and provide no substantial effect on ball movement, or they can be designed to affect the movement of a ball striking the impact surface. The main factor in determining whether a marking on the impact surface affects ball movement is its depth. Decorative sandblasting or fine milling, for example, generally produces markings on the impact surface having depth less than about 0.10 mm. Though these markings are visible, they do not substantially affect the movement of a ball.

Other markings on the impact surface are designed to affect ball movement. For example, grooves commonly are used on the impact surfaces of club faces. The particular dimensions of these grooves are determined by the United States Golf Association (U.S.G.A.), as described in Appendix II of the U.S.G.A. Rules. These grooves generally range in depth from at least about 0.15 mm to about 0.50 mm (the maximum allowed under U.S.G.A. rules), and they are placed on the impact surface to provide increased spin rates for balls hit off the face. Increased spin rate provides increased aerodynamic lift and improved controllability of golf balls hit off the impact surface. Other markings, such as round punch marks, also can be used on the impact surface.

The ball markings discussed above designed to affect ball movement also can be aesthetically appealing. Golfers are accustomed to seeing grooves or other markings on the impact surfaces of club faces, and they generally do not prefer a "blank" look on a large portion of the impact surface. Besides their aesthetic appeal and effects on ball movement, markings on the impact surface serve as guides to golfers for proper placement the club prior to striking a ball. A golfer who is in an "address" position, in which he is preparing to hit a ball, looks down on the face at an angle generally parallel to the face. The golfer can use markings on the impact surface as landmarks, allowing for improved placement of his shot. Removing markings from the impact surface of the face removes this utility.

Despite the potential advantages above, use of deeper markings affecting ball movement, such as grooves, presents certain disadvantages. Because these markings cut more deeply into the impact surface of the face than the shallower decorative markings, the thickness of the face is substantially reduced at the markings. As a result, overall face thickness must be increased to maintain structural integrity of the face and prevent formation of stress fractures along the edges of the markings. This is particularly important for markings placed at the central region of the impact surface, because this region receives the greatest number of impacts, as well as impacts imparting the most force on the impact surface. Increasing the overall face thickness leads to a reduced coefficient of restitution (C.O.R.) for the club head, resulting in reduced ball speed and distance for balls hit using the head.

To prevent the need for thickening of the face, these deeper markings can be omitted from the impact surface, leaving only shallow decorative markings on the striking surface. This is particularly appropriate for driver heads that, as discussed above, do not require markings, such as grooves, to provide increased ball spin. However, use of these shallow markings alone provides for reduced utility of the markings, because they are difficult, if not impossible, to see at address when the golfer is viewing the impact surface at an angle generally parallel to the impact surface. The deeper markings are more clearly seen at address and provide superior guidance to a golfer.

In view of the above, there remains a need for a face for a golf club head that allows for high C.O.R. without formation of stress fractures on the impact surface of the face, while maintaining an appearance that is aesthetically appealing and serves as a guide to golfers. The present invention fulfills this need and provides related advantages.

SUMMARY OF THE INVENTION

The present invention is embodied in a face for a golf club head that has an impact surface incorporating a central region that includes the geometric center of the impact surface. The central region is free of markings having depth greater than about 0.10 mm. Shallow markings are located in the central region having depth less than about 0.10 mm. Deep markings having depth greater than about 0.15 mm are located outside the central region. Preferably, the central region covers at least about 10 percent of the impact surface, more preferably about 20 percent, and most preferably about 40 percent.

In preferred embodiments of the present invention, the central region is disc-shaped with its center at the geometric center of the impact surface, and it preferably has a radius of about 0.6 cm, more preferably about 1.0 cm, and most preferably about 1.5 cm. Preferably, the shallow markings have depth of at least about 0.01 mm, and more preferable they have depth of about 0.02 mm. The shallow markings may be regions of texture comprising indentations and extrusions from the plane of the impact surface, or they may be regions of oxidation of the impact surface.

The deep markings preferably have depth of less than about 0.50 mm, and most preferably they have a depth of about 0.20 mm. In a preferred embodiment, the deep markings are straight grooves having constant width and depth. These grooves may be horizontal, vertical, or combinations of these. The shallow markings preferably are elongated straight markings having a width similar to that of the grooves, and they preferably are substantially parallel to at least a portion of the grooves. Preferably, the shallow markings generally extend to the edges of the central region.

In a preferred embodiment of the present invention, the impact surface incorporates a heel region and a toe region, and the central region is situated between the heel region and the toe region. The heel region and the toe region each incorporate deep markings. Preferably, the impact region also incorporates at least one deep marking above the central region. Preferably, the deep markings are filled with paint.

The present invention also is embodied in a face for a golf club head incorporating an impact surface having: a circular central region extending from a geometric center of the impact surface having a radius of about 1.5 cm, and free of markings having depth greater than about 0.10 mm; a heel region and a toe region, such that the central region is situated between the heel region and the toe region; horizontal shallow markings located in the central region, the shallow markings being straight and having depth between about 0.01 mm and about 0.10 mm; and, horizontal grooves located in the heel region and the toe region, the grooves being straight and having depth between about 0.15 mm and about 0.50 mm and substantially constant width and depth. Preferably, the grooves are colinear with and have width similar to that of the shallow markings. The horizontal shallow markings preferably have depth of about 0.02 mm, and the horizontal grooves preferably have depth of about 0.20 mm. The impact surface preferably incorporates a horizontal framing groove above the central region that is straight and has a depth of about 0.20 mm. The impact surface also preferably incorporates a horizontal shallow marking outside and preferably below the central region, the shallow marking being straight and having depth of about 0.02 mm.

The present invention also is embodied in golf club heads having a hosel, a face, a sole, and a back, the face as described above. The golf club head preferably is incorporated into a driver or a fairway wood.

The present invention also resides in a face for a golf club head comprising an impact surface free incorporating the geometric center of the impact surface, wherein the central region is free of markings having depth sufficient to impart substantial spin to a ball striking the markings. Shallow markings having depth insufficient to impart substantial spin to a ball striking them are located in the central region. Deep markings having depth sufficient to impart substantial spin to a ball string them are located outside the central region.

The present invention also resides in a method for making a face for a golf club head including the steps of: forming a face having an impact surface, the impact surface incorporating a central region free of markings having depth greater than about 0.10 mm; forming markings having depth between about 0.15 mm and about 0.50 mm on the impact surface outside the central region; and, using media blasting or laser energy to form markings in the central region having depth less than about 0.10 mm. A preferred aspect of the method includes the steps of: forming a face having an impact surface, the impact surface incorporating a toe end, a heel end, and a central region free of markings having depth greater than about 0.10 mm and situated between the toe and heel ends; forming toe grooves on the toe end and heel grooves on the heel end; placing a layer of removable coating material having openings in the layer over the impact surface, so that the openings overlay part of the central region; media blasting the layer for a duration such that shallow markings having depth less than about 0.1 mm are formed on the impact surface at the openings; and removing the layer. The method preferably includes filling the toe grooves and heel grooves with paint.

Other features and advantages of the present invention should become apparent from the following detailed description of the preferred embodiments.

DETAILED DESCRIPTION OF THE PREFERRED EMBODIMENT

Figure 1:
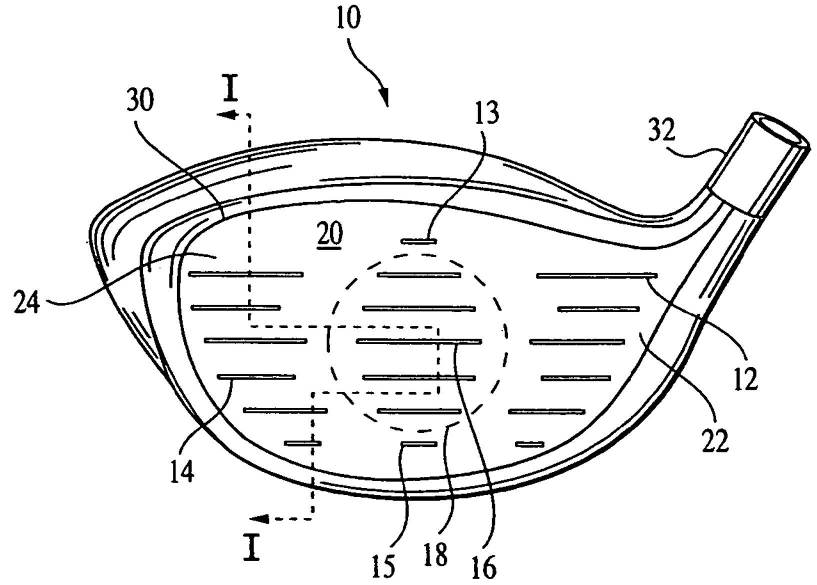
FIG. 1 is a front side elevational view of a golf club head incorporating a face that is an embodiment of the present invention.

The present invention resides in a face for a golf club head having an impact surface including both shallow and deep markings. The markings are configured to provide guidance to a golfer when the impact surface of the face is viewed at address. The present invention also relates to methods for making such club faces.

The impact surface includes a central region, as defined below, having shallow markings and free of deep markings. Outside of the central region on the impact surface are deep markings, designed to be more clearly visible than the shallow markings at address. In combination, the deep and shallow markings provide for an aesthetically appealing look when viewed head-on (i.e., from a view generally normal to the impact surface), as well as providing shot guidance to a golfer when viewed at address (i.e., from a view above and generally parallel to the impact surface). Because only shallow markings are present in the central region of the impact surface, thickening of the face to prevent cracking is not required. This avoids the reduction in C.O.R. resulting from a thicker face.

The central region is defined as a region on the impact surface including the geometric center of the impact surface. In preferred embodiments of the present invention, the central region incorporates at least about 10 percent of the impact surface, more preferably about 20 percent, and most preferably about 40 percent. In particular preferred embodiments of the present invention, the central region is disc-shaped and has its center at the geometric center of the impact surface. This circular central region preferably has a radius of about 0.6 cm, more preferably about 1.0 cm, and most preferably of about 1.5 cm.

The shallow markings located in the central region have depth insufficient to impart substantial spin to a golf ball contacting the shallow markings when the head is used to strike a golf ball. Preferably, the shallow markings have depth between about 0.01 and about 0.10 mm, and preferably of about 0.02 mm. Greater depth risks the problems of fracture and the subsequent need for face thickening and reduced C.O.R. discussed above. Shallow markings of less depth may not be clearly visible even when viewed head-on, and they may not substantially retain their structure after repeated impacts with a golf ball. As stated above, the shallowness of the shallow markings prevents them from substantially affecting the movement of a ball, such as by providing increased spin. The shallow markings preferably extend across most of the area of the central region to its edges, to avoid a blank look when viewed head-on. That is, most of the area of the central region preferably includes a pattern formed by the shallow markings. Faces within the scope of the present invention also may incorporate shallow markings located outside the central region.

The deep markings located outside the central region have depth sufficient to impart substantial spin to a golf ball contacting the deep markings when the head is used to strike a golf ball. Preferably, the deep markings have depth between about 0.15 mm and about 0.50 mm, preferably about 0.20 mm. These deep markings are deep enough to substantially affect the ball movement properties, such as spin. Preferably, the deep markings are configured to be grooves as defined by the U.S.G.A. rules. These grooves are straight and of substantially consistent cross-section. The grooves preferably have a depth of at most about 0.50 mm and a width of at most about 0.9 mm. Preferably, these grooves are substantially horizontal, or vertical on the impact surface. Use of horizontal and vertical grooves in combination, with vertical grooves located nearest the edge of the central region, can particularly serve to provide guidance for golfers at address.

The combination of a central region having shallow markings and free of deep markings, along with deep markings outside the central region, leads to a number of advantages. As discussed above, lack of deep markings in the central region avoids the need for thickening of the face to prevent cracking. The majority of impacts of the impact surface with a golf ball during play are at the central region. This is particularly true for players having greater skill, who also are more likely to hit the ball with sufficient force to risk fracture of the face. Use of the shallow markings, instead of deep markings, in the central region allows for a thinner face to be incorporated into the golf club head without increasing the risk of stress crack formation, because the shallow markings are not of sufficient depth to create stress points for fracture. This thinner face subsequently allows for design of a club head having a higher C.O.R.

The combination of deep and shallow markings also provides for ornamental and functional advantages. When viewed head on, both the deep and shallow markings clearly can be seen, providing a pleasing aesthetic appearance and avoiding a "blank look" to the impact surface, as would be present if no markings were in the central region. When viewed at address, the shallow markings are less clearly visible than the deep markings. As a result, the deep markings serve to frame the central region of the impact surface, providing guidance for a golfer to hit a ball consistently in the optimum location of the impact surface. Impact surfaces having shallow markings in the central region and deeper markings only outside the central region provide for superior utility and performance over impact surfaces incorporating markings of generally identical depth, or impact surfaces lacking markings entirely.

The deep and shallow markings can be in any pattern or design that is ornamentally appealing or functionally useful to a golfer using the club. In preferred embodiments of the present invention, the deep markings are horizontal grooves as defined by of the U.S.G.A. rules, and the shallow markings have lengths and widths substantially similar to the deep markings, so that the deep and shallow markings appear to form a generally continuous pattern of grooves on the impact surface when viewed head on.

A preferred embodiment of a golf club head incorporating a face within the scope of the present invention is shown in FIGS. 1 to 4. A golf club head 10 includes a face 30 having a visible impact surface 20. The impact surface 20 generally includes a circular central region 18. The impact surface also defines a toe region 24 and a heel region 22. The toe and heel regions 24 and 22 generally are adjacent to the central region 18, with the heel region 24 generally closer than the toe region 22 to a hosel 32 of the head 10.

Figure 2:
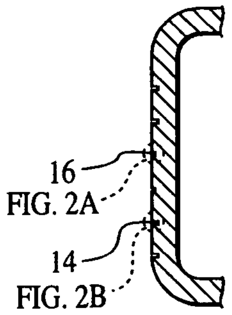
FIG. 2 is a sectional view of the face of the golf club head shown in FIG. 1 taken in the direction of arrows I-I.
Figure 2A:
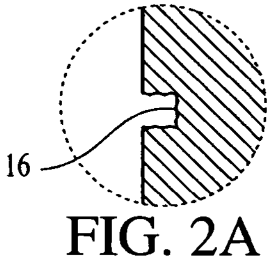
FIG. 2A is an enlarged view taken of FIG. 2 of a shallow marking of the face of the golf club head.
Figure 2B:
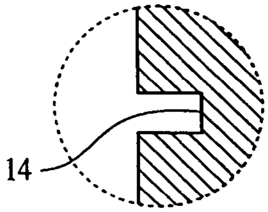
FIG. 2B is an enlarged view taken of FIG. 2 of a deep marking of the face of the golf club head.
Figure 3:
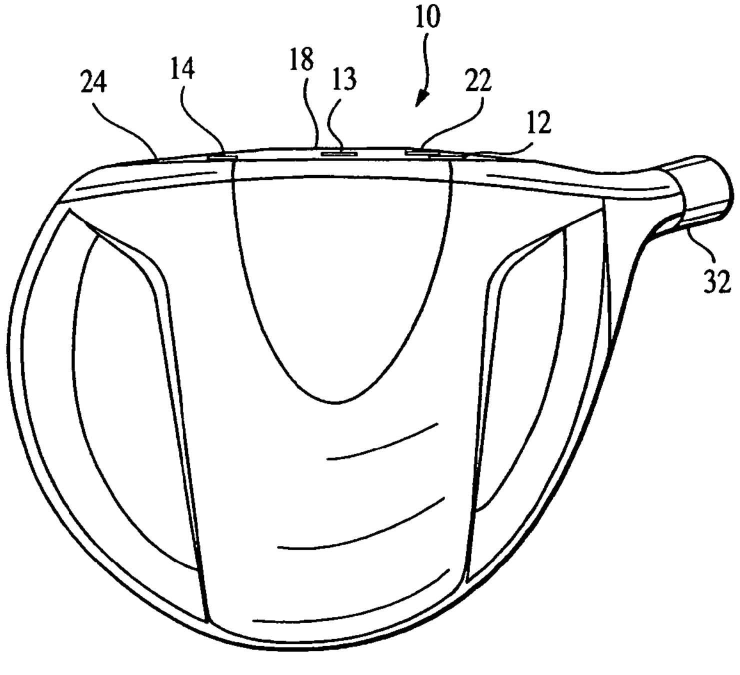
FIG. 3 is a bottom plan view of the golf club head shown in FIG. 1.

The central region 18 is free of deep markings, consistent with the scope of the present invention. The central region 18 includes shallow markings 16 configured to appear to be conventional grooves when viewed head-on. Unlike conventional grooves, these shallow markings 16 impart no substantial spin to a ball, and they do not substantially increase risk of fracture. A number of deep markings, specifically conventional grooves, are located in the heel and toe regions 22 and 24. Specifically, heel grooves 12 are located in the heel region 22 and toe grooves 14 located in the toe region 24. In this preferred embodiment, an additional deep marking, specifically an inner framing groove 13, is located above the central region 18. Also, an outer shallow marking 15 is located outside and below the central region 16. The relative depths of the heel and toe grooves 12 and 14 and of the shallow markings 16 are illustrated in FIGS. 2A and 2B, which show enlarged views of a toe groove 14 and a shallow marking 16 from the direction of arrows I-I of FIG. 1. As is illustrated in FIGS. 2A and 2B, the toe groove 14 has substantially greater depth than the shallow marking 16.

Figure 4:
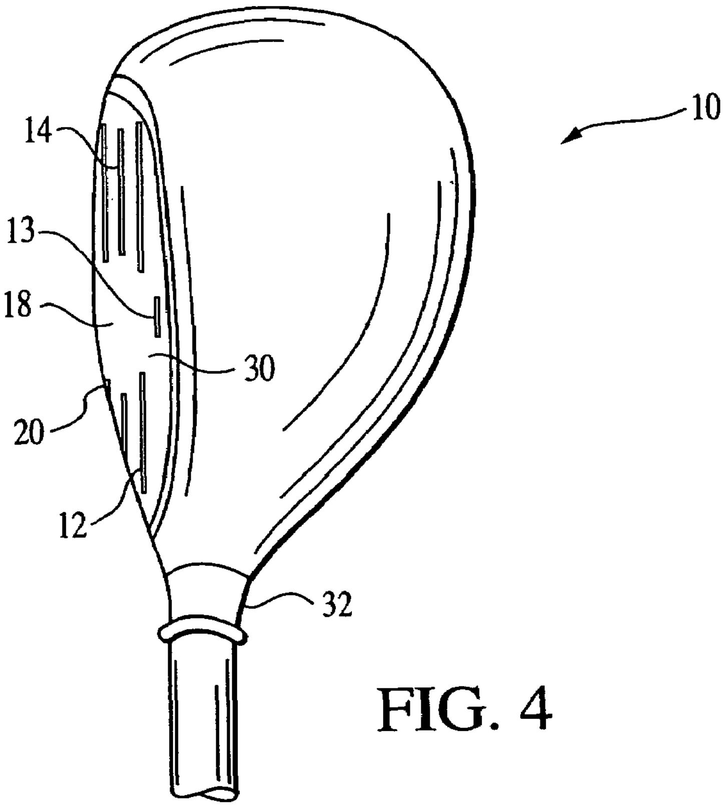
FIG. 4 is top plan view of the golf club head shown in FIG. 1.

In the preferred embodiment illustrated in the Figures, the shallow markings 16 and the lower shallow marking 15 all are colinear with and parallel to the heel grooves 12 and the toe grooves 14. The inner framing groove 13 also is parallel to the heel and toe grooves 12 and 14. As discussed above, when viewed head on, the shallow markings 16 appear to be conventional grooves, having similar widths and lengths. As a result, when a golfer inspects the club head 10 from a head-on view, the impact surface 20 appears to include a relatively continuous pattern of grooves from heel to toe, because the heel grooves 12, the toe grooves 14, the framing groove 13, the shallow markings 16 and the lower shallow marking 15 are all similar in appearance, as illustrated in FIG. 1. The aesthetically unpleasing aspects of existing thin club heads lacking grooves in their central regions are eliminated. However, when the club head 10 is placed behind the ball, either on the tee or on the ground, and the golfer assumes his or her stance, he or she views the impact surface 20 from a view above and generally parallel to it, as illustrated in FIG. 4. From this view the deeper heel grooves 12, toe grooves 14, and framing groove 13 are more clearly visible to the golfer than the shallow markings 16, which as shown in FIG. 4, are not discernible. The heel grooves 12, toe grooves 14, and framing groove 13 thus are useful for framing the ball to align the shot to impact the central region 18 of the impact surface 20. This makes the impact surface 20 appear larger and apparently easier to hit, improving the golfer's confidence.

Embodiments of the present invention can include shallow markings in the central region forming a variety of aesthetically appealing patterns other than shallow markings similar in appearance to grooves. For example, the shallow markings can be a mix of short and long dashes, as well as circular indentations, or any other patterns that prevent a large blank area in the central region when it is viewed head on. In any case, these shallow markings are of a depth and configuration to not impart substantial movement to a ball or lead to stress fractures in the central region.

The shallow markings of the present invention can be of generally consistent depth, or they can be in the form of regions of texture, in which material in the shallow marking has only been intermittently removed or displaced, resulting in textured regions. These textured regions can be formed using, for example, media blasting, which can result in small displacements of the face at the impact surface, resulting in a textured region. These displacements do not necessarily involve removal of material from the impact surface; that is, the average depth of the shallow marking may be approximately zero, with the textured surface comprising slightly extruding and slightly indented regions. These shallow markings incorporating extrusions and indentations, though insufficient to impart spin to a golf ball contacting them when hit by the club, nonetheless are visible when the impact surface is viewed generally head on.

The deep markings on the impact surface of the face of the present invention are formed using engraving, casting, or forging techniques generally known for use in forming such markings on club heads. After their formation on the impact surface, the deep markings may be paint-filled. In contrast, the shallow markings cannot substantially retain paint, due to their lack of sufficient depth. Paint-filling the deep markings results in increasing their visibility, particularly at address. This further emphasizes the framing effect of the combination of deep and shallow grooves.

The faces of the present invention can be incorporated into heads for a variety of club types commonly manufactured and used. The faces can be used in golf clubs incorporating any known conventional shaft sizes and designs. The faces of the present invention are particularly suited for use with heads for clubs known as drivers and fairway woods, because these clubs generally do not require use of grooves in the central region of the impact surface for acceptable club performance. Any number of sections may be combined to form club heads incorporating the faces of the present invention. The club head may comprise a cast body with a face attached to a front opening in any manner known to those of skill in the art such as by welding, brazing, binding screws, or lip-encasing. Alternatively, the club head may comprise a face-hosel section attached to crown, skirt and sole sections, as is known in the manufacture of golf club heads. The body of the club head may be hollow, as is commonly used for drivers. Similarly, stainless steel, titanium, aluminum, composite, or other known materials for manufacture of club heads may be used for one or more sections of the club head without departing from the scope of the present invention.

Figure 5:
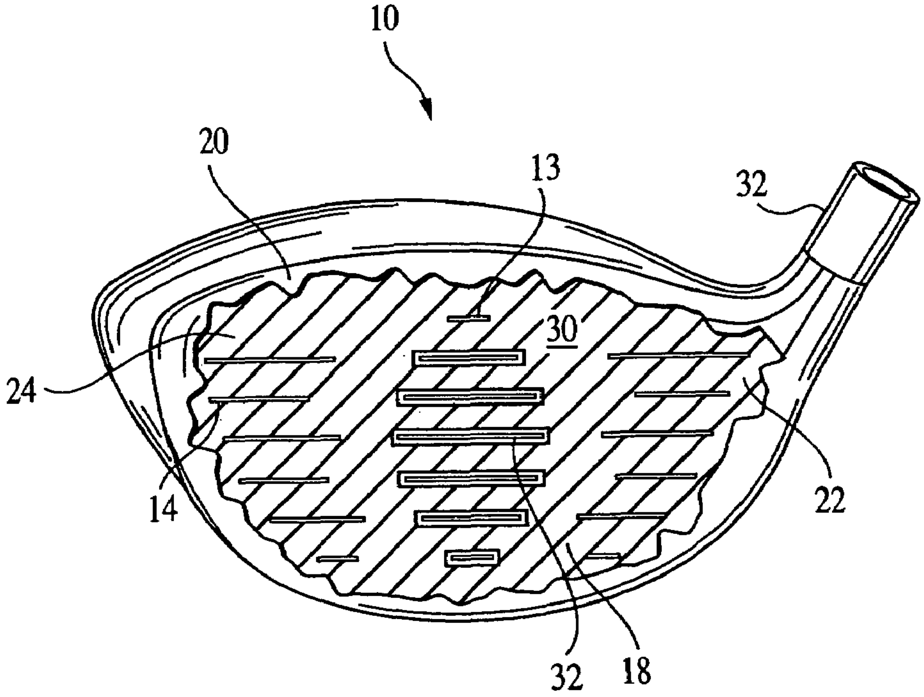
FIG. 5 is a front side elevational view of a golf club head prepared for production of a face using a preferred method within the scope of the present invention.

The present invention also relates to methods for preparing a face within the scope of the present invention. FIG. 5 illustrates a method particularly suited for preparing the face 30 including the use of media blasting (e.g., sandblasting) to produce the shallow markings 16. In the method, the heel grooves 12 and toe grooves 14 first are conventionally formed on the toe and heel regions 22 and 24, using for example, forging, cutting, or other methods for forming such grooves. After paint-filling of the heel grooves 12, toe grooves 14, and inner groove 13, a piece of thin material 30, such as masking tape or other thin, removable material, is applied to at least the central region 18 of the club face. As indicated in FIG. 5, a plurality of openings 32 in a predetermined pattern are cut out of the thin material 30, such that the areas of the central region 18 at the openings are exposed, while the remainder of the central region 18 is protected. Sandblasting of the impact surface 20 of the face 30 then is performed according to techniques known to those skilled in the art of sandblasting. The extent of the sandblasting is selected so that the amount of face material removed, if any, leads to markings having a maximum depth less than about 0.1 mm. When the layer 30 is removed from the face 20, shallow markings 16 and outer shallow marking 15 appear only at the areas of the central region 18 that were not covered by the layer 30. This allows for the resulting pattern of shallow markings to be visible when the face 20 is viewed head on, without providing substantial spin to a ball impacting them or stress points on the impact surface 30. The shallow markings 16 are too shallow to hold paint, and therefore only the heel grooves 12 and toe grooves 14 are filled with paint in finishing the club head 10. Preferably, the paint is white in color for increased visibility of the grooves relative to the body of the club head 10, to accentuate the framing effect at address.

An alternative preferred method for making golf club faces within the scope of the present invention includes use of lasers directed to the club face 30 to quickly and precisely create shallow markings 16 to specified depths in any configuration desired between the heel and toe grooves 12 and 14. Use of lasers provides more easily for shallow markings having more consistent depth than use of sandblasting, which allows for easier production of regions of having uneven depth or of the surface texture (i.e., indentations and extrusions) discussed above. Lasers also can be configured to produce markings that do not remove material to alter the depth of the impact surface; instead, the laser energy oxidizes the material of the impact surface, resulting in color change. This color change leads to a marking that is visible without imparting spin to a golf ball. The preferred laser type used is a Yttrium-Aluminum-Garnet (YAG) laser, such as the HM 1400 marketed by GSI Lumionics of Ottawa, Canada. Preferably, a 6-inch diameter lens having a 254 mm focal length is used. The impact surface 20 preferably is placed about 0.2 inches (5 mm) above the focal point of the lens, using a feed rate of 100 mm/s, a pulse frequency of 20 kHz, and a power level of 80%. The club face is fixtured under the laser normal to the beam axis. The shallow marking pattern to be added to the face can be loaded into the laser apparatus control as an HPGL format file, and the pattern can be burned onto the face more than once of necessary to achieve a desired appearance.

Although the invention has been disclosed in detail with reference only to the preferred embodiments, those skilled in the art will appreciate that additional golf club faces having shallow and deep markings on their impact surfaces and methods of preparing such faces can be made without departing from the scope of the invention. Accordingly, the invention is defined only by the following claims.

We claim:

1. A method for making a face for a golf club head comprising:

forming a face comprising an impact surface, the impact surface comprising a central region free of markings having depth greater than about 0.10 mm;

forming markings having depth between about 0.15 mm and about 0.50 mm on the impact surface outside the central region; and forming markings in the central region having depth less than about 0.10 mm.

2. A method for making a face for a golf club head, comprising:

forming a face comprising an impact surface, the impact surface comprising a toe end, a heel end, and a central region situated between the toe end and heel end, wherein the central region is free of markings having depth greater than about 0.10 mm;

forming toe grooves on the toe end and heel grooves on the heel end, wherein either the toe or heel grooves, or both, have a depth between about 0.15 mm and about 0.50 mm;

placing a layer of removable coating material over the impact surface, wherein the layer comprises openings overlaying part of the central region;

abrasive blasting the layer for a duration such that shallow markings having a depth less than about 0.1 mm are formed on the impact surface at the openings; and removing the layer.

3. The method of claim 2, further comprising a step of filling the toe grooves and heel grooves with paint.

4. The method of claim 1, wherein forming includes using abrasive blasting or laser energy.

5. The method of claim 1, wherein the markings formed within the central region have a depth greater than about 0.01 mm.

6. The method of claim 1, wherein the markings formed in the central region are elongated and straight.

7. The method of claim 1, wherein the central region includes a geometric center of the impact surface.

8. The method of claim 1, wherein the central region is circular.

9. The method of claim 8, wherein the central region has a radius of at least about 6 mm.

10. The method of claim 9, wherein the central region has a radius of at least about 10 mm.

11. The method of claim 10, wherein the central region has a radius of at least about 15 mm.

12. The method of claim 1, wherein the central region comprises at least about 10 percent of the impact surface.

13. The method of claim 12, wherein the central region comprises at least about 20 percent of the impact surface.

14. The method of claim 13, wherein the central region comprises at least about 40 percent of the impact surface.

15. The method of claim 1, further comprising forming markings outside the central region having a depth less than about 0.10 mm.

16. The method of claim 15, wherein the markings formed outside the central region having a depth less than about 0.10 mm have a depth greater than about 0.01 mm.

17. The method of claim 1, wherein the markings having depth between about 0.15 mm and about 0.50 mm are configured as substantially straight lines.

18. The method of claim 17, wherein the markings having depth between about 0.15 mm and about 0.50 mm are disposed horizontally, vertically, or combinations thereof.

19. The method of claim 1, wherein the markings having depth between about 0.15 mm and about 0.50 mm have a substantially constant width.

20. The method of claim 1, wherein the markings having depth between about 0.15 mm and about 0.50 mm have a substantially constant depth.

21. The method of claim 1, wherein the markings having depth between about 0.15 mm and about 0.50 mm are formed in at least one of a heel region and a toe region of the impact surface.

22. The method of claim 1, wherein at least one marking having depth between about 0.15 mm and about 0.50 mm is formed above the central region.

23. The method of claim 1, wherein the markings formed in the central region and the markings formed outside the central region have substantially similar widths.

24. The method of claim 1, wherein the markings formed in the central region and the markings formed outside the central region are substantially collinear.

25. The method of claim 1, wherein the markings formed in the central region are substantially parallel to at least a portion of the markings formed outside the central region.

26. The method of claim 1, wherein:

the markings formed in the central region are elongated and straight;

the central region encompasses a circular area having a radius of at least about 15 mm and includes a geometric center of the impact surface;

the central region comprises at least about 20 percent of the impact surface;

the markings having depth between about 0.15 mm and about 0.50 mm are formed in heel and toe regions of the impact surface;

the markings having depth between about 0.15 and about 0.50 are formed as substantially straight, horizontal lines having a substantially constant width; and the markings formed in the central region and the markings formed outside the central region are substantially collinear and have substantially similar widths.

27. The method of claim 1, wherein:

the markings formed in the central region are elongated and substantially straight;

the central region encompasses a circular area having a radius of at least about 15 mm and includes a geometric center of the impact surface;

the central region comprises at least about 20 percent of the impact surface;

the markings having depth between about 0.15 mm and about 0.50 mm are formed in heel and toe regions of the impact surface;

at least one marking having depth between about 0.15 mm and about 0.50 mm is formed above the central region;

the markings having depth between about 0.15 and about 0.50 are formed as substantially straight, horizontal lines having a substantially constant width; and the markings formed in the central region and the markings formed outside the central region are substantially collinear and have substantially similar widths.

28. The method of claim 1, wherein:

the markings formed in the central region are elongated and substantially straight;

the central region encompasses a circular area having a radius of at least about 15 mm and includes a geometric center of the impact surface;

the central region comprises at least about 20 percent of the impact surface;

the markings having depth between about 0.15 mm and about 0.50 mm are formed in heel and toe regions of the impact surface;

the markings having depth between about 0.15 and about 0.50 are formed as substantially straight, horizontal lines; and the markings formed in the central region and the markings formed outside the central region are substantially collinear.

29. The method of claim 28, wherein the markings formed in the central region have a depth greater than about 0.01 mm.

30. The method of claim 28, wherein the central region comprises at least about 40 percent of the impact surface.

31. The method of claim 1, wherein:

the central region has a periphery, and the markings having a depth between about 0.15 mm and 0.50 mm are all spaced apart from the periphery of the central region.

* * * * *